United States Patent Office

3,437,650
Patented Apr. 8, 1969

3,437,650
METHOD OF PREPARING TALL OIL FATTY ACID COMPOSITIONS
Alfred L. Rummelsburg, Chadds Ford, Pa., assignor to Hercules Incorporated, Wilmington, Del., a corporation of Delaware
No Drawing. Continuation-in-part of application Ser. No. 269,197, Mar. 29, 1963. This application Nov. 23, 1966, Ser. No. 596,466
Int. Cl. C09f 7/06; C08g 17/16
U.S. Cl. 260—97.5          6 Claims

ABSTRACT OF THE DISCLOSURE

Tall oil fatty acids are heated, in the absence of added water, at temperatures of from about 130° C. to 160° C. and in the presence of a crystalline clay catalyst for a period of time sufficient to provide a composition comprised of, by weight, based on the weight of tall oil fatty acids, from about 10% to 30% polymerized fatty acids and from about 70% to 90% of monomeric fatty acids.

---

This application is a continuation-in-part of application Ser. No. 269,197, filed Mar. 29, 1963, now abandoned.

This invention relates to novel partially polymerized tall oil fatty acid compositions and to a method of preparing same.

The polymerization of polyunsaturated fatty acids using acid-activated clay catalysts in the presence of 1–5% added water is known. The polymerization is carried out in a closed system to hold in the water at temperatures preferably within the range of 215° C. to 240° C. Advantages claimed from the use of added water and acid-activated clay catalyst are prevention of decarboxylation of fatty acid dimer and monomer, conversion of unsaturated monomer fatty acids to up to 60% polymerized fatty acids, mostly dimer and trimer, and selective polymerization of polyunsaturated fatty acids from oleic acid—polyunsaturated fatty acid mixtures to purify oleic acid. However, the polymerization mixtures obtained from such known processes have poor color for use in alkyds and relatively poor drying characteristics. Moreover, when the polymerized portion is recovered for use in making resins, etc., the byproduct monomer has a relatively low iodine number (40–80) and acid number (168–172) and relatively high titre (26–34° C.) and unsaponifiables (up to 7%).

A principal object of this invention is the provision of a method for the partial polymerization of tall oil fatty acids containing predominant amounts of oleic-type and linoleic-type acids without simultaneous decarboxylation of polymerized acids or monomer and with substantially less change in the monomeric constituents with regard to their total unsaturation and proportion of oleic-type acids to linoleic-type acids as compared to prior known processes for preparing polymerized tall oil fatty acids.

Another object of the invention is the provision of a partially polymerized tall oil fatty acid composition having a color satisfactory for use in alkyds and a method of making same.

A further object of the invention is the provision of a partially polymerized tall oil fatty acid composition which when utilized in alkyd resins gives improved bodying (viscosity increase) rate with consequent materially shorter times in the cooking kettle or, if desired, can be used in alkyds to provide increased oil length, without significant change in cooking time, thereby lowering the cost of the alkyd by replacement of a portion of the phthalic anhydride.

It has now been found that the above and other objects can be accomplished by polymerizing tall oil fatty acids at temperatures from about 130° C. to about 160° C. in the presence of a crystalline clay catalyst and coordinating the time and temperature of treatment and the amount of catalyst to obtain a product containing from about 10% to about 30% of polymerized fatty acids. It has been found that the polymerized product has improved color, improved bodying and drying characteristics, and improved odor as compared to the untreated tall oil fatty acids. Moreover, the monomeric material separated from the product, as by vacuum stripping or fractional distillation, is not substantially different from the starting tall oil fatty acids in the amount of unsaturation and the proportion of oleic-type acids to linoleic-type acids, and this, coupled with better color and less neutrals and unsaponifiables, results in upgrading the starting or original tall oil fatty acids.

Finally, the polymer portion of the product is characterized by a relatively high acid number and relatively low neutrals and unsaponifiables. The polymer portion of the product is also characterized by an ester content of at least about 10% and usually not more than about 25%, the ester being formed by a combination inter- and intramolecular condensation of the fatty acids with themselves.

Having described the invention generally, the following examples are given to illustrate specific embodiments thereof. The tall oil fatty acid compositions utilized in the examples contained from about 1% to about 4% rosin acids, had iodine numbers within the range from about 128 to about 131, acid numbers from about 194 to about 196, and a proportion of oleic-type acids to linoleic-type acids from about 0.86 to about 0.93. Parts are by weight unless otherwise indicated and color is Gardner.

Example 1

Tall oil fatty acids obtained by the fractional distillation of tall oil and having a resin acid content of about 4% and a fatty acid analysis as shown in the last column of Table 1c hereinafter were utilized in this example.

About 1,500 g. of the above tall oil fatty acids were agitated at 150° C. in glass equipment under $N_2$. 62 g. Super Filtrol (4.1% based on fatty acids) was added with continued agitation at 148–150° C. allowing moisture formed by dehydration of the clay to pass off to the atmosphere throughout the run. Samples were withdrawn throughout the run and filtered with suction. Portions of the samples were vacuum distilled at 0.5–1.0 mm. pressure to a final flask temperature of 245° C. to obtain monomer distillate and polymer residue.

Content of polymer and analyses of the monomer and polymer constituents are listed in Tables 1a, 1b and 1c below.

Samples of the polymerizate were analyzed for monomer constituents by gas-liquid chromatography. These TABLE 1a

| Sample No. | Polymerization Time, hours | Wt. Sample, g. | Monomer Distillate | | | Polymer Residue | | Percent of Total |
|---|---|---|---|---|---|---|---|---|
| | | | Wt., g. | Color | AN | Wt., g. | AN | |
| 1 | 1.0 | 180 | 153 | 2.5 | 195 | 26 | 158 | 14.5 |
| 2 | 2.17 | 180 | 150 | 2.5 | 194 | 30 | 155 | 16.7 |
| 3 | 3.66 | 180 | 147 | 2.5 | 195 | 31 | 155 | 17.2 |
| 4 | 5.1 | 195 | 158 | 3 | 193 | 37 | 151 | 19.0 |
| Original tall oil fatty acids | | 240 | 234 | 3.5 | 196 | 4 | | 1.7 |

TABLE 1b

| | Saponification Number | Iodine Number | Titre Value, °C. | Percent Neutrals [1] | Percent Rosin Acids | Percent Conjugated FA [2] | Rast., Mol. Wt |
|---|---|---|---|---|---|---|---|
| Monomer Dist. No. 1 | | 129 | −7.1 to −7.5 | 2.7 | 2.8 | 6 | |
| Monomer Dist. No. 2 | | 128 | −8.1 to −8.4 | 2.3 | 2.8 | 6 | |
| Monomer Dist. No. 3 | | 125 | −8.6 | | | | |
| Monomer Dist. No. 4 | | 125 | −5.7 | 2.5 | 2.7 | 6 | |
| Original tall oil fatty acids (Dist.) | | 129 | −8.1 to −8.3 | 3.1 | 2.9 | 12 | |
| Polymer Residue No. 1 | 184 | | | 1.3 | | | 630 |
| Polymer Residue No. 4 | 185 | | | 1.5 | | | 619 |

[1] Via partition chromatography.  [2] Via ultraviolet spectrophotometry.

TABLE 1c

| | Monomer Dist. No. 1 | Monomer Dist. No. 2 | Monomer Dist. No. 3 | Monomer Dist. No. 4 | Original Tall Oil Fatty Acids Dist. |
|---|---|---|---|---|---|
| Percent: | | | | | |
| Palmitate | 1.6 | 1.3 | 1.6 | 1.5 | 1.3 |
| Palmitoleate | 1.0 | 1.1 | 1.0 | 1.0 | 0.9 |
| Unknown | <0.5 | <0.5 | <0.5 | <0.5 | <0.5 |
| Stearate | 2.3 | 2.2 | 2.5 | 2.2 | 1.5 |
| Oleate | 45 | 44 | 50 | 45 | 41 |
| Unknown | <1 | <1 | <1 | <1 | <1 |
| Linoleate (9,12) | 36 | 33 | 35 | 32 | 34 |
| Linoleate (11,14) | 4.3 | 3.6 | 3.8 | 3.7 | 3.2 |
| Conjugated Linoleate | 1.7 | 1.6 | 2.3 | 1.9 | 3.7 |
| Unknown | <2 | <2 | <2 | <2 | <2 |
| Conjugated Linoleate | 3.1 | 3.1 | 3.0 | 3.1 | 4.2 |
| Unknown | <2 | <2 | <2 | <2 | <2 |
| Do | 2 | 2 | 2 | 1.5 | 2 |

EXAMPLE 2

The polymerization in this example was carried out in a 5-gallon 316 stainless steel autoclave provided with internal side baffles, external electric heating elements, and an internal coil for rapid water-cooling. An anchor-type stirrer was arranged in the bottom portion. Top openings were provided for introducing an inert atmosphere, for allowing removal of water formed by decomposition of catalyst during the run, and for removing samples during the run. A bottom outlet fitted with a suitable pressure filter (superimposed nitrogen under pressure) was provided for removal of catalyst from the final product, after cooling to below 100° C.

The autoclave was charged with 10,230 g. of a tall oil fatty acid fraction obtained by the fractional distillation of tall oil and having the analysis shown in column 1 of Table 2b. This was then blanketed with $N_2$ and 420 g. of Filtrol 20, which had been precalcined at 160° C. for 6 hours (weight loss as $H_2O$ equals 14.7%), was added at room temperature with agitation. The mixture was heated to 140° C. in 1.9 hours and held at this temperature. Samples were removed during the run, rapidly cooled, filtered and analyzed. Results are set forth in Table 2a below.

TABLE 2a

| Time at 140° C. | Color | Percent Polymer |
|---|---|---|
| 0.0 | 7 | 14.0 |
| 0.5 | 7 | 16.1 |
| 1.0 | 6–7 | 17.3 |
| 2.0 | 6–7 | [1] 18.4 |
| 3.0 | 7 | 19.4 |
| 5.0 | 7–8 | [2] 21.5 |

[1] (A.N. 188).  [2] (A.N. 186).

constituents are listed in Table 2b below in the order they came off.

TABLE 2b

| | Original Fatty Acids | Sample Taken at end of— | |
|---|---|---|---|
| | | 2.0 hrs.[1] | 5.0 hrs.[1] |
| Percent: | | | |
| Palmitic | 0.4 | 0.4 | 0.4 |
| Palmitoleic | 0.4 | 0.4 | 0.4 |
| Unknown $C_{17}$ | 0.4 | <0.3 | <0.3 |
| Stearic | 1.7 | 2.3 | 1.8 |
| Oleic | 44 | 48 | 37 |
| Unknown | <2 | <2 | 2 |
| 9, 12 Linoleic | 35 | 33 | 24 |
| 11, 14 Linoleic | 5.0 | 3.8 | 2.8 |
| Conjugated Linoleic | 4.4 | 2.0 | 1.2 |
| Unknown | <2 | <1 | <1 |
| Conjugated Linoleic | 7.5 | 3.2 | 2.6 |
| Unknown | <2 | <1 | <1 |
| Do | <2 | <1 | <1 |

[1] Total summation of fatty acids as monomer constituents in the polymerization mixture. Divide by
$$\frac{100 - \text{percent polymer}}{100}$$
to obtain fatty acid constituents on a 100% monomer basis.

EXAMPLES 3–18

Polymerizations in these examples were carried out in the same equipment, in the same manner, and utilizing the same materials as in Example 2 with the following exceptions:

(1) The tall oil fatty acids were heated to polymerization temperature prior to adding catalyst.

(2) In Examples 3, 8, 9, 17 and 18 the charge was blanketed with $CO_2$ instead of $N_2$.

(3) In Examples 3, 8, 9 and 14–17 the tall oil fatty acids utilized were obtained by the fractional distillation of tall oil and had the analysis shown in column 1 of Table 4.

(4) As otherwise noted.

The data are tabulated in Table 3 below in which $I_2$ No. means iodine number.

TABLE 3

| Example No. | 3 | 4 | 5 | 6 |
|---|---|---|---|---|
| Tall oil fatty acids | See above | Like Example 2 (color 5+) | Like Example 2 (color 5+) | Like Example 2 (Improved color 3+) |
| Catalyst | (Improved color 3+) Filtrol 20 | Filtrol 20 | Filtrol 20 | Filtrol 20 Calcined at 160° C. 4 hrs. |
| Percent Catalyst | 4.0 | 2.0 | 7.0 | 7.0 |
| Temp., ° C. | 120 | 130 | 130 | 130 |

| Time (hrs.) | 2.0 | 3.0 | 4.0 | 4.5 | 2.0 | 3.0 | 5.0 (I₂ No. 127) | 0.5 | 1.0 | 2.0 | 3.0 | 5.0 | 0.5 | 1.0 | 2.0 | 3.0 | 4.5 |
|---|---|---|---|---|---|---|---|---|---|---|---|---|---|---|---|---|---|
| Color (Gardner) | 4+ | 4+ | 5+ | 5+ | 6 | 6 | 7 | 5+ | 5+ | 5+ | 6+ | 7 | 5+ | 5+ | 5+ | 6+ | 6+ |
| Percent Polymer | 10.5 | 11.5 | 12.8 | 13.2 | 9.6 | 10.9 | 11.7 | 15.5 | 18.4 | 21.8 | 23.5 | 25.1 | 12.7 | 14.9 | 17.0 | 18.6 | 20.6 |

| Example No. | 7 | 8 | 9 |
|---|---|---|---|
| Tall oil fatty acids | Like Example 2 (Color 5+) | Like Example 3 (Improved color 3+) | Like Example 3 (Color 5+) |
| Catalyst | Filtrol 20 | Super Filtrol Calcined 400° C., 3 hrs. | Filtrol 20 |
| Percent Catalyst | 4.0 | 4.0 | 4.0 |
| Temp., ° C. | 140 | 140 | 140 |

| Time (hrs.) | 0.5 | 1.0 | 2.0 | 3.0 | 5.5 | 1.0 | 2.0 | 3.0 | 4.0 | 4.5 | 0.5 | 1.0 | 2.0 | 3.0 | 4.5 |
|---|---|---|---|---|---|---|---|---|---|---|---|---|---|---|---|
| Color (Gardner) | 6− | 6 | 6+ | 7− | — | 5 | 5 | 5 | 6 | 6 | 5+ | 5+ | 6− | 6 | 7 |
| Percent Polymer | 14.0 | 16.4 | 17.8 | 19.8 | 21.9 | 10.6 | 12.8 | 14.1 | 15.1 | 15.9 | 11.0 | 13.7 | 15.8 | 18.0 | 19.9 |

| Example No. | 10 | 11 | 12 |
|---|---|---|---|
| Tall oil fatty acids | Like Example 2 (Color 5+) | Like Example 2 (Color 5+) | Like Example 2 (Color 5+) |
| Catalyst | Super Filtrol | Filtrol 20 | Filtrol 20 |
| Percent Catalyst | 4.0 | 4.0 | 2.0 |
| Temp., °C. | 154 | 154 | 154 |

| Time (hrs.) | 0.5 | 1.0 | 2.0 | 3.0 | 4.5 (I₂ No. 125) | 0.5 | 1.0 | 2.0 | 3.0 | 4.5 (I₂ No. 124) | 0.5 (I₂ No. 130) | 1.0 | 2.0 (I₂ No. 128) | 3.0 | 5.0 (I₂ No. 125) |
|---|---|---|---|---|---|---|---|---|---|---|---|---|---|---|---|
| Color (Gardner) | 6+ | 6+ | 7 | 7+ | 7+ | 6+ | 6+ | 7 | 7+ | 7+ | 6 | 6 | 6+ | 7 | 7 |
| Percent Polymer | 16.9 | 20.4 | 24.4 | 26.5 | 27.3 | 17.3 | 20.8 | 24.0 | 26.1 | 28.2 | 11.0 | 13.0 | 13.9 | 15.3 | 17.7 |

| Example No. | 13 | 14 | 15 |
|---|---|---|---|
| Tall oil fatty acids | Like Example 2 (Color 5+) | Like Example 3 (Color 4+) | Like Example 3 (Color 4+) |
| Catalyst | Filtrol 20 | Super Filtrol | Super Filtrol |
| Percent Catalyst | 6.0 | 4.0 | 4.0 |
| Temp., ° C. | 154 | 152 | 160 |

| Time (hrs.) | 0.5 | 1.0 | 2.0 | 3.0 | 5.0 | 1 (AN 195) | 2 (AN 186) | 3 | 3.66 (I₂ 129) | 0.5 (AN 186) | 1.0 (AN 187) | 1.5 (AN 187) | 2.0 (AN 187) | 3.0 | 4.0 |
|---|---|---|---|---|---|---|---|---|---|---|---|---|---|---|---|
| Color (Gardner) | 6 | 6+ | 7− | 7 | 8 | 5+ | 5+ | 5+ | 6− | 5+ | 5+ | 6+ | 7+ | 8+ | 8+ |
| Percent Polymer | 22.4 | 26.3 | 30.1 | 32.4 | 35.4 | 17.1 | 19.2 | 20.7 | [1] 21.7 | [2] 15.6 | [2] 17.6 | 19.7 | 21.5 | 22.6 | [2] 23.9 |

| Example No. | 16 | 17 | 18 |
|---|---|---|---|
| Tall oil fatty acids | Like Example 3 (Color 4+) | Like Example 3 (Improved Color 3+) | Like Example 1 (Improved Color 3) |
| Catalyst | Super Filtrol | Filtrol 20 | Filtrol 20 |
| Percent Catalyst | 4.0 | 4.0 | 4.0 |
| Temp., ° C. | 175 | 140 | 140 |

| Time (hrs.) | 0.5 (AN 187) | 1.0 | 1.5 (AN 17) | 2.0 | 3.0 | 4.0 (AN 182) | 1.0 | 2.0 | 3.0 | 4.0 | 4.5 | 1.0 | 2.0 | 3.0 | 4.0 | 4.5 |
|---|---|---|---|---|---|---|---|---|---|---|---|---|---|---|---|---|
| Color (Gardner) | 6+ | 6+ | 6+ | 6+ | 6+ | 6+ | 5 | 5 | 6− | 6 | 6 | 5+ | 5+ | 5+ | 5+ | 6 |
| Percent Polymer | [3] 18.5 | 20.5 | 22.2 | [3] 23.5 | 25.4 | [3] 27.0 | [4] 14.6 | 17.2 | 18.2 | 19.5 | [4] 19.8 | 13.9 | 16.9 | 18.8 | 20.0 | 20.4 |

[1] 3.66 hour polymerizate was vacuum-distilled at 0.5–3 mm. pressure to remove monomer (78.3%) leaving polymer (21.7%) as residue. I₂ No. of Monomer was 127.

[2] 0.5, 1.5 and 4.0 hour polymerizates were vacuum-distilled at 0.5–3 mm. pressure to remove monomer leaving polymer as residue. I₂ No. of monomers was 122, 121 and 114, respectively.

[3] 0.5, 2.0 and 4.0 hour polymerizates were vacuum-distilled at 0.5–3 mm. pressure to remove monomer leaving polymer as residue. I₂ No. of monomers was 124, 121 and 121, respectively.

[4] 1.0 and 4.5 hour polymerizates were vacuum-distilled at 0.5–3.0 mm. pressure to obtain monomer leaving polymer as residue. I₂ No. of monomer was 125 and 123, respectively.

EXAMPLES 19–21

Samples of polymerizate from Examples 14, 15 and 16 were vacuum-distilled at 0.5–1.0 mm. to a maximum flask temperature of 245° C. to separate monomer constituents for gas-liquid chromatographic analysis (below) after transformation into the methyl ester. Results of the analysis in comparison with the original tall oil fatty acids are set forth in Table 4 below.

TABLE 4

| | Original Tall Oil Fatty Acids (typical) | Ex. 19 (From Ex. 14) | Ex. 20 (From Ex. 15) | | | Ex. 21 (From Ex. 16) | | |
|---|---|---|---|---|---|---|---|---|
| | | 3.66 hrs. | 0.5 hr. | 2.0 hrs. | 4.0 hrs. | 0.5 hr. | 1.5 hr. | 4.0 hrs. |
| Percent: | | | | | | | | |
| Palmitic | 0.4 | 1.3 | 0.7 | 0.5 | 0.6 | 5 | 1.7 | 0.7 |
| Palmitoleic | 0.4 | 1.1 | 0.7 | 0.5 | 0.6 | 0.4 | 0.6 | 0.6 |
| Unknown C₁₇ acids | <0.4 | <0.5 | <0.5 | <0.5 | <0.5 | <0.5 | <0.5 | <0.5 |
| Stearic | 1.7 | 2.8 | 2.6 | 2.5 | 2.5 | 2.5 | 2.8 | 2.2 |
| Oleic | 45 | 50 | 53 | 52 | 54 | 49 | 51 | 53 |
| Unknown | <1 | <1 | <1 | <1 | <1 | <1 | <1 | <1 |
| 9,12 linoleic | 35 | 35 | 35 | 31 | 30 | 31 | 31 | 29 |
| 11,14 linoleic | 3.0 | 4.0 | 3.1 | 2.7 | 2.8 | 2.6 | 2.8 | 2.0 |
| Conjugated linoleic | 4.4 | 1.8 | 1 | 1 | 1 | 1 | 1 | 1 |
| Unknown | <2 | <1 | <1 | <1 | <1 | <1 | <1 | <1 |
| Conjugated linoleic | 7.5 | 2.0 | 2.2 | 2.0 | 1.8 | 2.4 | 2.4 | 2.1 |
| Unknown C₂₀ | <2 | <1 | <1 | <1 | <1 | <1 | <1 | <1 |
| Do | <2 | <1 | <1 | <1 | <1 | 1 | 1 | 1 |
| AN | 195 | 196 | 194 | 194 | 194 | 193 | ---------- | 193 |

EXAMPLES 22–28

Samples of polymerizate from Examples 4, 5, 9, 10, 11, 12 and 13 were analyzed as in Examples 19–21 except that the polymerizates were not distilled prior to being transformed into methyl esters. Thus, the chromatographic analysis reports only the monomer ester therein (the polymer remains on the chromatographic column and the monomer passes off via analysis), the analysis summation being based on the total original polymerized ester. Results are set forth in Table 5 below in comparison with the original tall oil fatty acids.

erizations were carried out in the same equipment and in the same manner as Example 2. The procedure for molecular distillation residue (MDR) determination utilized in these examples was as follows: A 0.3 g. sample of the polymerization mixture was distilled at a bath temperature of 175° C. in small-scale equipment capable of maintaining low pressure. The distillation time was one hour with the pressure during at least 45 minutes of this period being less than 5 microns. The sample was added to a 2 ml. tall form beaker stuffed with glass wool to achieve sample dispersion. The polymer residue was

TABLE 5

|  | Original Tall Oil Fatty Acids | Ex. 22 [1] (From Ex. 10) 4.5 hrs. | Ex. 23 [1] (From Ex. 11) 4.5 hrs. | Ex. 24 [1] (From Ex. 4) 4.5 hrs. | Ex. 25 [1] (From Ex. 5) 5.0 hrs. | Ex. 26 [1] (From Ex. 12) 1.0 hr. | Ex. 26 [1] (From Ex. 12) 5.0 hrs. |
|---|---|---|---|---|---|---|---|
| Percent: |  |  |  |  |  |  |  |
| Palmitic | 0.5 | 0.4 | 0.4 | 0.4 | 0.4 | 0.5 | 0.5 |
| Palmitoleate | 0.5 | 0.4 | 0.4 | 0.4 | 0.4 | 0.5 | 0.5 |
| Unknown $C_{17}$ acids | <0.5 | <0.3 | <0.3 | <0.3 | <0.3 | <0.3 | <0.3 |
| Stearic | 2.0 | 2.4 | 1.9 | 2.2 | 1.9 | 1.9 | 1.8 |
| Oleic | 40±2 | 45 | 37 | 39 | 34 | 41 | 38 |
| Unknown | <2 | 3 | 3 | <2 | 3 | <2 | <2 |
| 9,12 linoleic | 34±2 | 26 | 20 | 30 | 20 | 31 | 27 |
| 11,14 linoleic | 3.1 | 2.6 | 3.0 | 4.1 | 2.4 | 3.8 | 3.2 |
| Conjugated linoleic | 4 | 1.5 | 1.2 | 2.2 | 1.0 | 2.3 | 1.8 |
| Unknown | <2 | <1 | <1 | <1 | <1 | <1 | <1 |
| Conjugated linoleic | 6 | 2.9 | 2.5 | 4.1 | 2.0 | 3.8 | 2.8 |
| Unknown $C_{20}$ | <1 | <1 | <1 | <1 | <1 | <1 | <1 |
| Do | <1 | <1 | <1 | <1 | <1 | <1 | <1 |

|  | Original Tall Oil Fatty Acids | Ex. 27 [1] (From Ex. 13) 0.5 hr. | Ex. 27 [1] (From Ex. 13) 2.0 hrs. | Ex. 27 [1] (From Ex. 13) 5.0 hrs. | Ex. 28 [1] (From Ex. 9) 1.0 hr. | Ex. 28 [1] (From Ex. 9) 2.0 hrs. | Ex. 28 [1] (From Ex. 9) 4.5 hrs. |
|---|---|---|---|---|---|---|---|
| Percent: |  |  |  |  |  |  |  |
| Palmitic | 0.5 | 0.4 | 0.4 | 0.4 | 0.5 | 0.5 | 0.5 |
| Palmitoleate | 0.5 | 0.4 | 0.4 | 0.4 | 0.6 | 0.4 | 0.3 |
| Unknown $C_{17}$ acids | <0.5 | <0.3 | <0.3 | <0.3 | <0.3 | <0.3 | <0.3 |
| Stearic | 2.0 | 1.8 | 1.9 | 2.8 | 1.7 | 2.0 | 1.5 |
| Oleic | 40±2 | 37 | 37 | 39 | 41±2 | 40±2 | 36 |
| Unknown | <2 | <2 | 5 | 5 | <2 | <2 | <2 |
| 9,12 linoleic | 34±2 | 24 | 19 | 18 | 31±2 | 28±2 | 26 |
| 11,14 linoleic | 3.1 | 2.7 | 2.7 | 2.2 | 3.0 | 2.8 | 1.8 |
| Conjugated linoleic | 4 | 1.3 | 1.0 | 1.0 | 1 | 1 | <1 |
| Unknown | <2 | <1 | <1 | <1 | <1 | <1 | <1 |
| Conjugated linoleic | 6 | 1.9 | 1.7 | 1.8 | 3 | 2 | 1.5 |
| Unknown $C_{20}$ | <1 | <1 | <1 | <1 | <1 | <1 | <1 |
| Do | <1 | <1 | <1 | <1 | <1 | <1 | <1 |

[1] Total summation of fatty acids as monomer constituents in the polymerization mixture. Divide by $\frac{100-\text{percent polymer}}{100}$ to obtain fatty acid constituents on a 100% monomer basis.

EXAMPLE 29

Samples of polymerizate from Example 17 were analyzed as in Examples 22–28. Results are set forth in Table 6 below in comparison with the original tall oil fatty acids.

TABLE 6

|  | Original Tall Oil Fatty Acids | Ex. 29 [1] (From Ex. 17) 1.0 hr. | 2.0 hrs. | 3.0 hrs. | 4.5 hrs. |
|---|---|---|---|---|---|
| Percent: |  |  |  |  |  |
| Palmitic | 0.7 | 0.5 | 0.7 | 0.7 | 0.6 |
| Palmitoleate | 0.6 | 0.6 | 0.7 | 0.6 | 0.6 |
| Unknown $C_{17}$ acids | <0.3 | <0.3 | <0.3 | <0.3 | <0.5 |
| Stearic | 2.1 | 1.7 | 2.3 | 1.7 | 2.1 |
| Oleic | 48±2 | 37 | 39 | 40 | 38 |
| Unknown | <2 | <2 | <2 | <2 | <2 |
| 9,12 linoleic | 40±2 | 26 | 27 | 25 | 25 |
| 11,14 linoleic | 3.6 | 2.9 | 3.2 | 2.0 | 2.3 |
| Conjugated linoleic | 3 | 1 | 1 | <1 | <1 |
| Unknown | <2 | <1 | <1 | <1 | <1 |
| Conjugated linoleic | 5 | 2.5 | 2.3 | 2.2 | 1.4 |
| Unknown $C_{20}$ | <1 | <1 | <1 | <1 | <1 |
| Do | <1 | <1 | <1 | <1 | <1 |

[1] Total summation of fatty acids as monomer constituents in the polymerization mixture. Divide by $\frac{100-\text{percent polymer}}{100}$ to obtain fatty acid constituents on a 100% monomer basis.

EXAMPLES 30–36

The tall oil fatty acids utilized in these examples were like those utilized in Examples 14, 15 and 16. Polymweighed after cooling. Results are set forth in Table 7 below.

TABLE 7

| Example No. | 30 | 31 | 32 | 33 | 34 | 35 | 36 |
|---|---|---|---|---|---|---|---|
| Tall oil fatty acids | (1) | (1) | (1) | (1) | (1) | (1) | (1) |
| Catalyst | (2) | (2) | (2) | (2) | (2) | (3) | (2) |
| Percent Catalyst | 4.0 | 4.0 | 4.0 | 4.0 | 4.0 | 4.0 | 4.0 |
| Temp., °C | 152.0 | 154.0 | 154.0 | 154.0 | 153.0 | 154.0 | 142.0 |
| Time (hrs) | 1.25 | 2.0 | 1.0 | 1.0 | 1.0 | 1.0 | 1.0 |
| Color (Gardner) | 7+ | 7+ | 6 | 5+ | 5+ | 6+ | 5+ |
| Percent MDR | 20.0 | 26.0 | 23.5 | 23.4 | 22.5 | 21.0 | [4] 13.6 |

[1] Like Examples 14, 15 and 16 (Color 4+).
[2] Super Filtrol.
[3] Filtrol 20.
[4] AN 191.

EXAMPLE 37

This example illustrates that significant decarboxylation does not occur in the process according to the present invention. The reduction in acid number of the polymer constituents is essentially caused by the formation of inter- and intra-molecular esters via addition of some COOH to a double bond simultaneously with polymerization.

A 25,164 g. lot of a composite of products prepared in Examples 32, 33 and 34 was continuously vacuum-stripped (contact time approximately 2–3 seconds, pressure 1–1.5 mm.). The weight of polymer bottoms recovered was 6,188 g. (24.3%) and monomer distillate was 18,851 g. (75.7%). The acid number of the monomer distillate was 194–195 which was in the same range as that of the original tall oil fatty acids. The acid number of the polymer residue was within the range of 159–161, while its HClO₄ acidity was in the same range indicating no anhydride formation. Its neutrals content via chromatographic analysis was within the range of 1–1.5%. In addition, the saponification number of the polymer residue was in the range of 185–187 and its molecular weight range (Rast) 580–610. Its molecular distillation residue (total polymer content) determination at 175° C. (to obtain total nonvolatile polymer content vs. volatile monomer) was 90–92%.

About 848 g. of the above polymer residue was molecularly distilled in a spinning disk unit (Consolidated Still, 5-inch disk, Electrodynamics Corp., Rochester, N.Y.). Results of this distillation are set forth in Table 8 below.

TABLE 8

| Cut No. | Total Percent Distilled | Rotor Vapor, °C. | $p$, microns | AN | Sap. No. | Mol. Wt. (Rast) | $n_D^{30}$ |
|---|---|---|---|---|---|---|---|
| 1 | 5.99 | 114–129 | 33–29 | 193 | | 450 | 1.4662 |
| 2 | 10.87 | 141–151 | 28–28 | 153 | 190 | | 1.4707 |
| 3 | 22.34 | 165–168 | 28–28 | 140 | | | 1.4796 |
| 4 | 32.57 | 168–170 | 28–28 | 144 | | 610 | 1.4802 |
| 5 | 40.77 | 170–169 | 28–28 | 148 | | | 1.4812 |
| 6 | 48.53 | 169–171 | 28–28 | 154 | 197 | 600 | 1.4822 |
| 7 | 54.54 | 171–172 | 28–28 | 161 | | | 1.4835 |
| 8 | 58.65 | 172–173 | 28–28 | 167 | | 640 | 1.4846 |
| 9 | 62.53 | 173–176 | 28–28 | 174 | | | 1.4864 |
| 10 | 65.01 | 176–178 | 28–28 | 178 | 193 | 607 | 1.4873 |
| Residue | 94.56 | | | | | | |
| holdup [1] | 100.00 | | | 163 | 188 | 920 | 1.4919 |

[1] Percent Residue = 35 (mostly trimer and higher polymers).

EXAMPLE 38

This example illustrates the substantial improvement in bodying rate obtained with the partially polymerized products of the present invention as compared with similar products containing a lower percentage of polymer. Polymerized tall oil fatty acids prepared as herein described and containing 6% and 10% fatty acid polymer were utilized in the preparation of polymerized tall oil fatty acid modified pentaerythritol—phthalic anhydride alkyds using 59% by weight of polymerized fatty acid constituents. These alkyds were prepared by the fusion process utilizing 650 parts of polymerized tall oil fatty acids, 230 parts of pentaerythritol, and 396 parts of phthalic anhydride. At a temperature of 240° C. the times to reach viscosity $Z_6$ on the Gardner-Holdt scale are set forth in Table 9 below.

TABLE 9

| | Polymerized Tall Oil Fatty Acids | |
|---|---|---|
| | 6% Polymer | 10% Polymer |
| Time (hours) | 4.5 | 3.0 |
| Acid Number | 15.0 | 20.5 |

Example 38 shows a substantial time improvement for the product containing the 10% polymer as compared to the product containing the 6% polymer. Moreover, it is estimated that the amounts of additional polymerized tall oil fatty acids containing 6% polymer and 10% polymer which can be added respectively to the two polymerized fatty acid products in order to be able to cook to comparable acid numbers, e.g., 13.5, at 240° C. to get $Z_1$–$Z_2$ Gardner viscosities in comparable times, e.g., 5.5 hours, are 4 parts by weight, based on the weight of polymerized product, in the case of the 6% polymer product and 8 parts by weight, based on the weight of the polymerized product, in the case of the 10% polymer product. Thus, it is possible with the products of this invention to substantially increase the oil length utilizable in alkyd resins.

In addition, the use of the 10% polymer product of this invention permits the use of more of a polyhydric alcohol of decreased functionality, e.g., glycerol, to replace part of the pentaerythritol in phthalic alkyds, as compared to the 6% polymer product.

EXAMPLE 39

This example illustrates the improvement in polymerization rate obtained by (1) the use of noncalcined catalysts versus calcined catalysts and (2) the use of a closed system. The following polymerization runs were made utilizing the autoclave described in Example 2.

Run No. 1

The autoclave was charged with 10,000 g. of tall oil fatty acids of the type used in Example 3 (color 3+, $I_2$ No. 132) and 410 g. of Filtrol 20 with agitation at room temperature. The free space was flushed with nitrogen and the autoclave closed and heated to 140° C. in 1.3 hours with continued agitation. Heating was continued at 140° C. with agitation, samples withdrawn through the bottom outlet at various time intervals, cooled to 100° C., filtered and analyzed.

Run No. 2

The same procedure as in Run No. 1 was utilized except that the Filtrol 20 was pre-calcined at 163° C. for 6 hours, thereby losing 14.7% of its weight as water of decomposition.

Run No. 3

The same procedure as that in Example 17 was utilized except that the Filtrol 20 was added in one minute at 140° C. and the autoclave then quickly closed. Samples were withdrawn through the bottom outlet as in Runs No. 1 and No. 2.

The data from the above runs are tabulated in Table 10 below. The data from Example 17 are also included in Table 10 for purposes of comparison.

TABLE 10

| | Closed System | | | | | | Open System | | Open System Closed System | |
|---|---|---|---|---|---|---|---|---|---|---|
| | Run No. 1 Filtrol 20 | | | Run No. 2 Calcined Filtrol 20 | | | Data from Ex. 17 Filtrol 20 | | Run No. 3 Filtrol 20 | |
| Time (hr.) | Percent Polymer | Color | AN | Percent Polymer | Color | AN | Percent Polymer | Color | Percent Polymer | Color |
| 0 | 15.1 | 5+ | 188+ | 10.6 | 6 | 190 | | | | |
| 0.5 | [1] 18.4 | 6 | | [2] 13.7 | 6 | | | | 12.9 | 5+ |
| 1.0 | 20.9 | 6+ | 186+ | 15.4 | 6+ | 189 | 14.6 | 5 | 14.9 | 5+ |
| 2.0 | 25.4 | 5+ | | 18.2 | 6+ | | 17.2 | 5 | 18.6 | 5+ |
| 3.0 | [1] 28.4 | 6+ | 182 | [2] 20.5 | 6+ | 185 | 18.2 | 6– | 21.0 | 6+ |
| 4.0 | 30.0 | 7 | | 22.4 | 7 | | 19.5 | 6 | 23.8 | 6+ |
| 4.5 | | | | | | | 19.8 | 6 | | |
| 5.0 | 31.5 | 8 | 180 | 23.9 | 7 | 184 | | | 25.9 | 6+ |
| 7.0 | 33.0 | 8+ | 179 | 26.0 | 7 | 183 | | | 29.6 | 7 |

[1] 0.5 and 3.0 hr. polymerizates were vacuum-distilled at 0.5–3 mm. pressure to obtain monomer leaving polymer as residue. $I_2$ No. of monomers, 123 and 118 respectively.
[2] 0.5 and 3.0 hr. polymerizates were vacuum-distilled at 0.5–3 mm. pressure to obtain monomer leaving polymer as residue. $I_2$ No. of monomers, 127 and 126 respectively.

EXAMPLE 40

Selected polymerizate samples from Runs 1 and 2 of Example 39 were transformed into the methyl esters and were analyzed by gas-liquid chromatography. Results are set forth in Table 11 below.

TABLE 11

| | Original Tall Oil Fatty Acids | From Run No. 1 | | | From Run No. 2 | | |
|---|---|---|---|---|---|---|---|
| | | 0.5 hr.[1] | 3.0 hrs.[1] | 7.0 hrs.[1] | 0.5 hr.[1] | 3.0 hrs.[1] | 7.0 hrs.[1] |
| Percent | | | | | | | |
| Palmitic | 0.7 | 0.5 | 0.6 | 0.6 | 0.6 | 0.6 | 0.6 |
| Palmitoleate | 0.6 | 0.7 | 0.5 | 0.4 | 0.6 | 0.7 | 0.5 |
| Unknown $C_{17}$ | <0.3 | <0.2 | <0.2 | <0.2 | <0.2 | <0.3 | <0.2 |
| Stearic | 2.1 | 1.9 | 1.5 | 1.9 | 1.8 | 2.0 | 1.9 |
| Oleic | 48±2 | 38±2 | 35±2 | 34±2 | 35±2 | 40±2 | 38±2 |
| Unknown | <2 | <1 | <1 | <1 | <1 | <1 | <1 |
| 9,12 linoleic | 40±2 | 23 | 16 | 13 | 27 | 26 | 20 |
| 11,14 linoleic | 3.6 | 2.2 | 1.8 | 1.2 | 2.9 | 2.6 | 1.6 |
| Conjugated linoleic | 3 | <1 | <1 | <1 | 1 | <1 | <1 |
| Unknown $C_{20}$ | <2 | <1 | <1 | <1 | <1 | <1 | <1 |
| Conjugated linoleic | 5 | 1.5 | 1.0 | 1.3 | 1.8 | 1.5 | 1.4 |
| Unknown $C_{20}$ | <1 | <1 | <1 | <1 | <1 | <1 | <1 |
| Do | <1 | <1 | <1 | <1 | <1 | <1 | <1 |

[1] Total summation of fatty acids as monomer constituents in the polymerization mixture. Divide by $\frac{100-\text{percent polymer}}{100}$ to obtain fatty acid constituents on a 100% monomer basis.

As will be evident from the examples, the process of the invention comprises the partial polymerization of fatty acids in the presence of a crystalline clay catalyst under relatively mild temperature conditions and coordinating the temperature and time of treatment and the amount of catalyst to produce a fatty acid product containing from about 10% to about 30% by weight, based on the weight of the fatty acids, of polymerized fatty acids. The polymerization can be carried out in an open or closed vessel at atmospheric or superatmospheric pressures. It is desirable, where feasible, to employ an inert atmosphere, e.g., carbon dioxide or nitrogen, to prevent or minimize degradation in color.

The polymerization can be carried out utilizing either a batch or continuous procedure. The simplest batchwise procedure involves heating the fatty acids to the desired reaction temperature with agitation and then adding the catalyst as rapidly as possible with continued agitation for the desired reaction time. The polymerization system can be vented to allow water formed by decomposition of the catalyst (when noncalcined) to pass to the atmosphere during the polymerization run. In large-scale plant runs the slight exothermic nature of the reaction often becomes evident by a gradual increase in temperature of several degrees (C.). Very moderate cooling employed for a short period either during or directly after addition of the catalyst will prevent this temperature increase. Polymerization is terminated by cooling as rapidly as possible to about 100° C. or below. The catalyst can then be removed as by filtration, decantation, or the like.

In an alternative open system batch procedure, the catalyst can be added to the agitated fatty acids prior to heating and the agitated mixture then heated to the desired temperature for the required time. Because of rapid evolution of water via decomposition of catalyst under these conditions, particularly where a nearly full reaction vessel is utilized, it is desirable that the catalyst be precalcined for use in this type of procedure to prevent foaming.

Both of the above procedures can be carried out in a closed system under autogenous or other pressures. Moreover, continuous operation utilizing either the open or closed systems is readily possible by constantly pumping into the reaction mixture at temperature, a prepolymerization mixture at a lower temperature, i.e., 80–100° C., while constantly removing mixture at the same rate. Continuous operation using a tubular system, preferably closed, to obtain turbulent flow is also possible.

The partial polymerization process of this invention is carried out in the absence of added water and can be carried out at temperatures as low as 120° C. and as high as 175° C. Best results are obtained by employing a temperature within the range of from about 130° C. to about 160° C. and carrying out the process within this range is recommended. Temperatures below 120° C. require too long a period of time to produce the desired partial polymerization and, hence, are not economically feasible. A temperature above 175° C. initiates decomposition and/or decarboxylation of both polymer and monomer constituents as well as changes in the characteristics of the monomer constituents, e.g., amount of unsaturation, and proportion of monosaturated to polysaturated acids.

The time of treatment will be coordinated with the temperature and amount of catalyst to give, in all cases, a partially polymerized product having the characteristics desired. In general, times of treatment can vary from about 5 minutes to about 5 hours, the higher temperatures and/or amounts of catalyst requiring the shorter times and the lower temperatures and/or amounts of catalyst, the longer times. The proper coordination of temperature, time and amount of catalyst is readily determinable by one skilled in the art based on the teachings herein. However, to further assist in such determination, the results of a large number of partial polymerizations of tall oil fatty acids within the scope of the invention were analyzed to obtain a prediction equation for polymer concentration as a function of time, temperature and catalyst concentration.

The resulting equation, (percent polymer) = (percent catalyst) (0.06069 Temp. ° C. − 5.636) + 0.01226 (Temp. ° C.) (Time) + 1.745, which is based on the open system batch procedure, the use of uncalcined Super Filtrol, Filtrol 20, or similar crystalline clays as catalysts, and the addition of catalyst at reaction temperature, has a standard error of estimate of 2.136 units in the percent polymer. This indicates that, within the limits of the ranges of the independent variables employed and the polymer concentrations observed, two-thirds of the calculated values will be within 2.1 units in the percent polymer of the value that would be obtained by experimentation. In only one case in twenty would predicted and observed values differ by more than 4.3 units in the percent polymer.

In general, any of the crystalline clay minerals can be used as catalysts herein. Typical of these are the acid-activated clays such as those obtained from montmorillonite, kaolinite, hectorite, attapulgite, and the like. Particularly preferred among the acid-activated clay catalysts are the "Filtrols" which are defined in Handbook of Material Trade Names by Zimmerman and Lavine as follows: "Filtrol, a group of acid-activated adsorbents and catalysts made from the mineral montmorillonite $(MgCa)OAl_2 5SiO_2 nH_2O$. They are supplied as fine white powders, 85–95% passing through a 200-mesh screen."

The bentonite clays, particularly those containing at least 75% montmorillonite, are likewise quite satisfactory. The pH of the acid clays will be above 2 but below 7 and preferably from about 3 to about 5.

The amount of clay catalyst used will, of course, be coordinated with the temperature and time of treatment to, in all cases, give the desired type of product. In general, and again depending on time and temperature, the amount of catalyst can range from about 1% to about 10% of the weight of the tall oil fatty acids. The preferred range of clay catalyst is from about 3% to about 5% on the same basis.

On heating to elevated temperatures, the complex silicates in many crystalline clay catalysts of the type herein utilized chemically decompose to some extent to form small amounts of water, the particular amount depending, of course, on the amount of such catalyst used. For example, separate oven calcination tests on the Filtrol catalysts (Filtrol 20) indicate the loss in weight of the catalyst by dehydration to be as follows:

| Temperature, °C. | Time, hours | Percent Weight Loss |
|---|---|---|
| 162 | 6.5 | 14.7 |
| 130 | 3 | 12.6 |
|  | 5 | 13.7 |
|  | 7 | 14.7 |

This water may be permitted to pass from the system as it is formed or, alternatively, may be retained in the system to increase the rate of reaction. If the formation of water in the system is not desired, the catalyst can be subjected to a calcination treatment prior to use and the water of dehydration removed as formed. Use of the catalyst in uncalcined state is preferred since calcination appears to impair, at least to some extent, its effectiveness.

In the examples, the time for addition of catalyst on temperature was about 5 minutes or less. However, in large-scale plant runs, especially when the reaction vessel is about three-fourths full, the catalyst addition time is of necessity somewhat slower when it is noncalcined to prevent rapid formation of water with attendant foaming. Under these conditions, the catalyst addition time can be as much as 0.25–1 hour or more, and the catalyst is desirably slurried with tall oil fatty acids prior to addition. However, when a closed system is employed, the minimum catalyst addition time restrictions diminish.

The clay catalyst can be removed from the reaction mixture in any suitable manner as by filtering or centrifuging. The resulting partially polymerized fatty acid composition can then be used as such as can be subjected to fractional distillation under vacuum or to vacuum stripping to separate the monomeric constituents from the polymeric constituents. The former can then be utilized as upgraded tall oil fatty acids and the latter as polymerized tall oil fatty acids.

The partially polymerized fatty acid compositions of the present invention have excellent drying characteristics. In comparison, polymerized fatty acids now commercially available, have poor drying characteristics. This makes the partially polymerized fatty acid compositions of the invention particularly suitable for use in alkyd resins as a replacement for a portion, e.g., up to about 20%, of acids such as phthalic acid and isophthalic, depending upon the type of alkyd desired. Moreover, when so utilized these compositions give an improved bodying (viscosity increase) rate as compared with unpolymerized or only slightly polymerized fatty acids, thereby materially shortening the time in the cooking kettle. They also give more flexible films with somewhat improved water resistance.

The fatty acid compositions of the present invention can be utilized in the preparation of alkyd resins in accordance with conventional and well-known procedures, e.g., fusion or solvent processes. Since these are well known (see Payne, Organic Coating Technology, vol. 1), no further description need be given.

The fatty acids contemplated for treatment herein are tall oil fatty acids. The invention is particularly applicable to the treatment of tall oil fatty acid fractions obtained by the fractional distillation of tall oil and containing major quantities of unsaturated fatty acids such as oleic and linoleic acids in admixture with minor quantities of saturated acids such as stearic and palmitic and varying percentages of rosin acids. Typical tall oil fractions of this type may contain from about 30% to about 45% linoleic-type acids, from about 30% to about 45% oleic-type acids, from about 3% to about 10% saturated acids such as stearic and palmitic, from about 0% to about 25% rosin acids and minor percentages of various other acids.

It will thus be seen that the present invention provides novel and advantageous partially polymerized tall oil fatty acid compositions and a method of making same. These compositions are characterized by acid numbers within the range of from about 2 to about 15 units less than that of the starting fatty acids, e.g., from about 180 to about 194, iodine numbers within the range of 90% of to the same as that of the starting acids, e.g., from about 120 to about 135, a titre below about 10° C. and preferably below about 0° C., had a color which does not differ from the color of the starting fatty acids by more than about 5 units on the Gardner scale. In most cases, the color of these products will not be over about 8 Gardner. These products have excellent drying properties and thus are well suited for use in alkyd resins.

The invention also provides a means of upgrading tall oil fatty acids by partial polymerization as herein described followed by separation of the monomer portion from the polymerized portion. The monomer portion has better color and less neutrals and unsaponifiables than the starting tall oil fatty acids and is further characterized by an iodine number within the range from about the same to about 10% less than that of the starting material, e.g., an iodine number from about 118 to about 130, an acid number which varies from about the same to about 1–2% less than that of the starting material, e.g., an acid number within about the same range as that of the starting tall oil fatty acids, e.g., from about 192 to about 195, where the acid number of the starting tall oil fatty acids is from about 194–196, and a proportion of total oleic-type acids to total linoleic-type acids from about 0.85 to about 1.7 and preferably from about 1.0 to about 1.3.

The recovered polymer portion is a viscous oil made up of polymeric material including from about 10% to about 25% of inter- and intra-molecular esters and is characterized by an acid number range from about 150 to about 165, a saponification number range of from about 183 to about 194, an $HClO_4$ acid number approximately the same as the regular acid number of the polymer, indicating no anhydride content, neutrals and unsaponifiables below about 3%, molecular weight by the Rast method varying from about 550 to about 660, and iodine number from about 115 to about 130.

What I claim and desire to protect by Letters Patent is:

1. The method which comprises:
    (A) heating tall oil fatty acids, in the absence of added water, at a temperature from about 130° C. to about 160° C. in the presence of from about 1% to 10% by weight, based on the weight of the tall oil fatty acids, of a crystalline clay catalyst for a period of time to provide a partially polymerized tall oil fatty acid composition containing from about 10% to about 30% by weight, based on the weight of starting tall oil fatty acids, of polymerized fatty acids and from about 70% to about 90% by weight, based on the weight of starting tall oil fatty acids, of monomeric fatty acids, and terminating polymerization by cooling the partially polymerized tall oil fatty acid composition to at least about 100° C., said partially polymerized tall oil fatty acid composition having an acid number not more than about 15 units below the acid number of the starting tall oil fatty acids, an iodine number not less than about 90% of the iodine number of the starting tall oil fatty acids, and a color which does not exceed the color of the starting tall oil fatty acids by more than about 5 units on the Gardner scale.

2. The method in accordance with claim 1 wherein the preparation of the partially polymerized tall oil fatty acid composition is carried out in an open system.

3. The method in accordance with claim 1 wherein the preparation of the partially polymerized tall oil fatty acid composition is carried out in a closed system.

4. The method in accordance with claim 1 wherein the starting tall oil fatty acids contain up to about 25% by weight, based on the weight of the tall oil fatty acids, of resin acids.

5. The method in accordance with claim 1 wherein the partially polymerized tall oil fatty acid composition is separated into monomer and polymer portions, the monomer portion having less neutrals and unsaponifiables than the starting tall oil fatty acids and an iodine number not more than 10% less than the starting tall oil fatty acids.

6. The method in accordance with claim 5 wherein the polymer portion is a viscous oil containing from about 10% to about 25% of inter- and intra-molecular ester.

References Cited

UNITED STATES PATENTS 2,793,220  5/1957  Barrett et al. _____ 260—407
3,066,160  11/1962  Hampton _____ 260—976

OTHER REFERENCES

Markley, "Fatty Acids," part 2, Interscience Publishers, Inc., 1961, pp. 1036–1037, copy available in Scientific Library.

DONALD E. CZAJA, *Primary Examiner.*

W. E. PARKER, *Assistant Examiner.*

U.S. Cl. X.R.

260—22, 407